United States Patent
Nason

[15] 3,653,294
[45] Apr. 4, 1972

[54] BLIND FASTENER

[72] Inventor: Edgar F. Nason, 7461 Canby Avenue, Reseda, Calif. 91335

[22] Filed: June 27, 1969

[21] Appl. No.: 837,220

[52] U.S. Cl. ........................................85/70, 85/77, 151/31
[51] Int. Cl. ..........................................................F16b 13/06
[58] Field of Search........................85/61, 70, 72, 73, 74, 77, 85/78; 151/31

[56] References Cited

UNITED STATES PATENTS

| | | | |
|---|---|---|---|
| 3,136,203 | 6/1964 | Davis | 85/69 |
| 3,453,927 | 7/1969 | Moore | 85/70 |
| 2,030,167 | 2/1936 | Miller | 85/70 |
| 2,324,142 | 7/1943 | Eklund | 85/70 |
| 2,384,321 | 9/1945 | Lees | 85/78 |
| 2,479,075 | 8/1949 | Martin | 151/31 |
| 3,143,917 | 8/1964 | Commer | 151/31 |
| 3,196,918 | 7/1965 | Hampton | 151/22 |
| 3,203,303 | 8/1965 | Laisy | 85/77 |
| 3,279,304 | 10/1966 | Hopkins | 85/77 |
| 3,322,449 | 5/1967 | Becker | 85/70 |
| 3,365,998 | 1/1968 | Zahodiakin | 85/70 |

FOREIGN PATENTS OR APPLICATIONS

| | | | |
|---|---|---|---|
| 928,122 | 5/1947 | France | 85/77 |

*Primary Examiner*—Marion Parsons, Jr.
*Attorney*—Lyon & Lyon

[57] ABSTRACT

A blind fastener of two piece construction to be placed through a workpiece which is accessable only from one side which may be clamped up by conventional tooling. At installation the blind end of the core of the male core member is drawn into an annealed threaded section of the female nut member forming a bulb in the back of the work area and at the same time providing a deformed thread locking means to resist loosening under vibrations.

4 Claims, 14 Drawing Figures

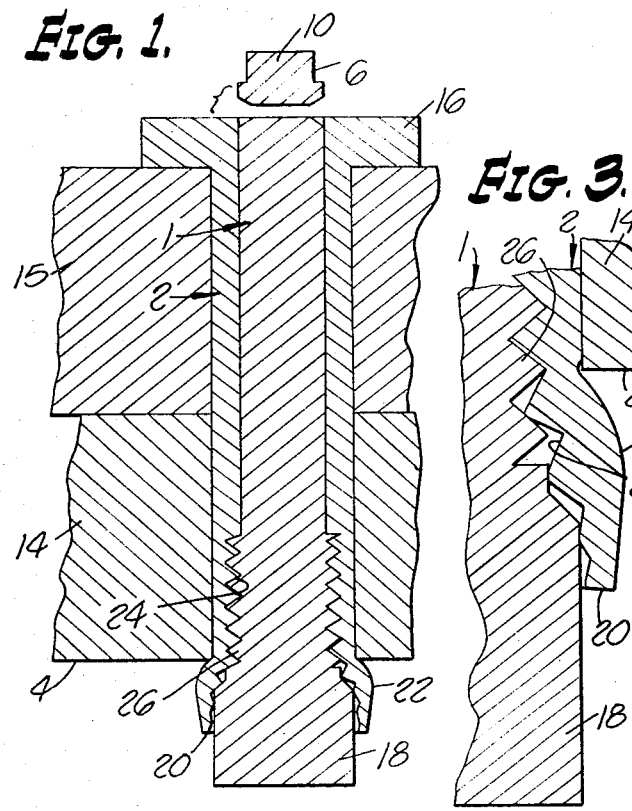
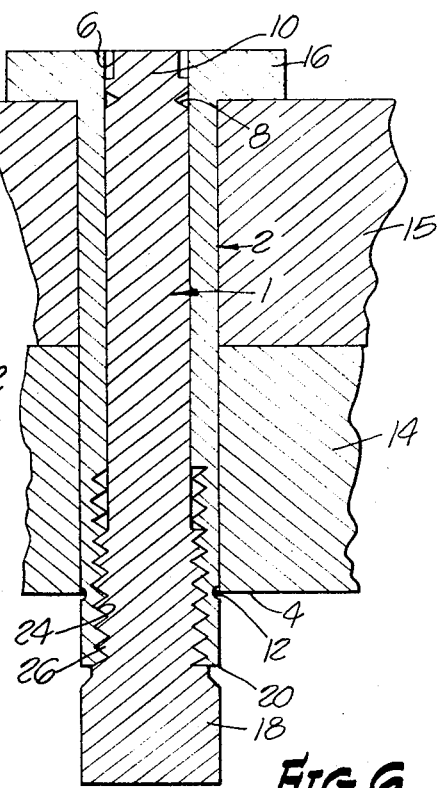
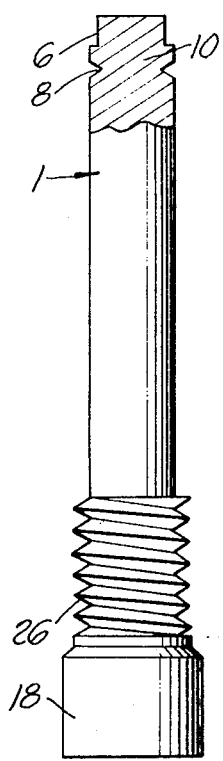
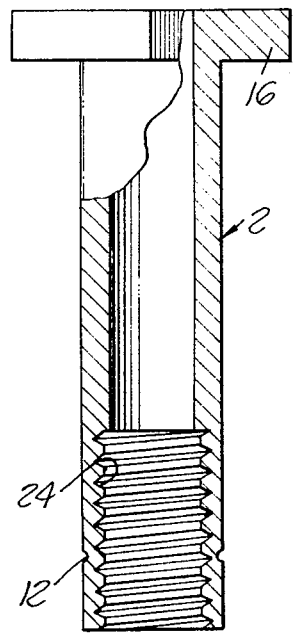
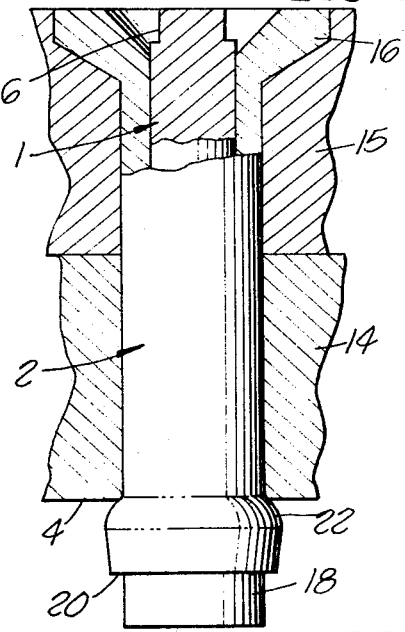
INVENTOR.
EDGAR F. NASON
BY Lyon Lyon
ATTORNEYS

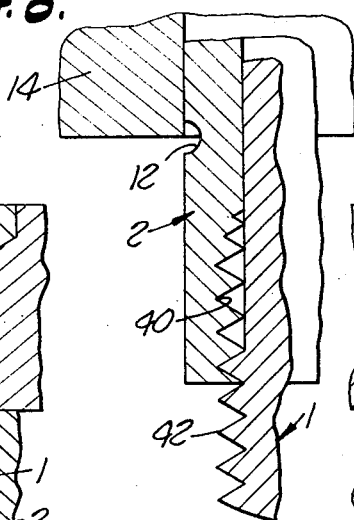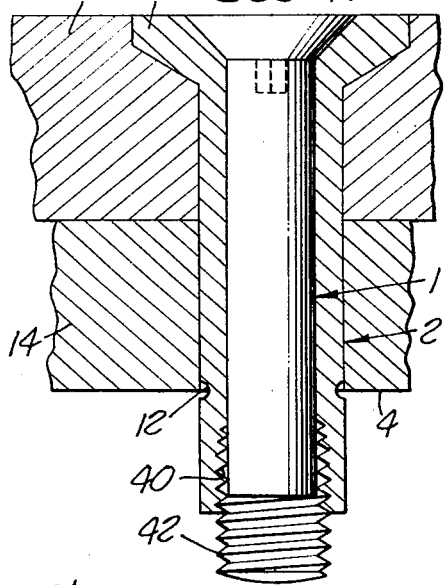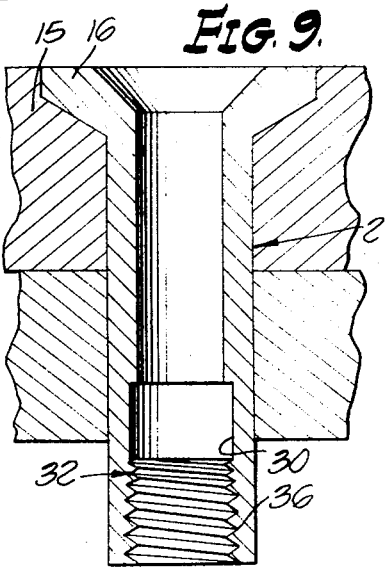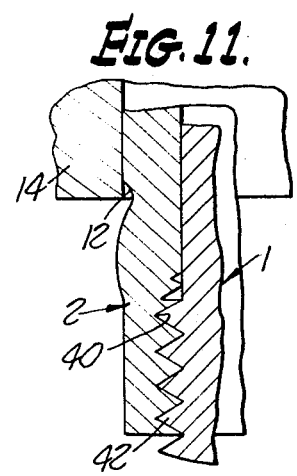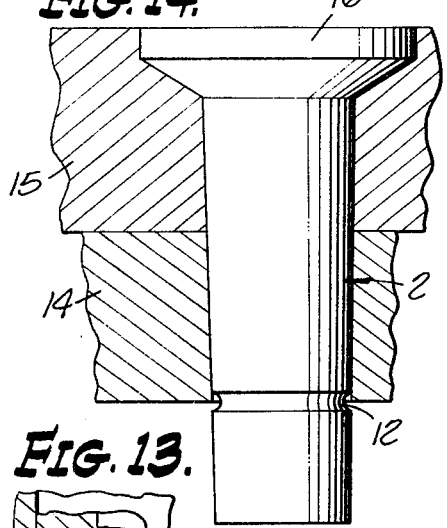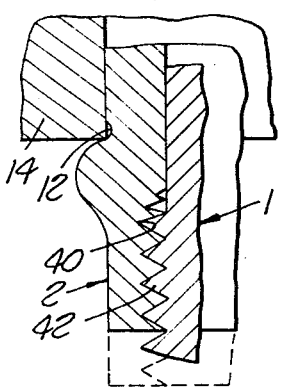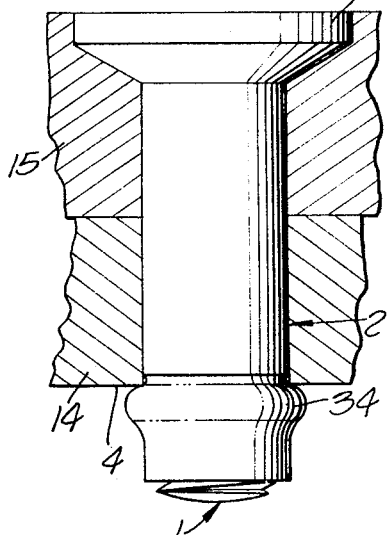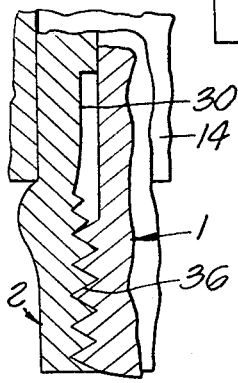

3,653,294

BLIND FASTENER

OBJECTS OF THE INVENTION

The principal object of the present invention is to provide a two piece blind fastener that may be clamped by normal wrenching means that is inexpensive to manufacture in that it does not require critical tolerance.

A further object of the present invention is to provide a structure which is designed to give high clamp up to provide maximum integrity of the joint with good grip accomodation.

A still further object of the present invention is to provide a blind fastener wherein the threaded area of the sleeve and core bolt are at the blind side of the structure so that there will be no threads in the shear area except for very short grip lengths.

A still further object of the present invention is to provide a device in which both parts can be manufactured by conventional high speed production methods.

These and other objects and advantages will become apparent when the specification is read in view of the accompanying drawings.

DESCRIPTION OF THE DRAWINGS

FIG. 1 is a cross sectional elevation of a blind fastener in its contracted configuration.

FIG. 2 is a cross sectional elevation of a blind fastener prior to clamping.

FIG. 3 is a partial cross sectional elevation illustrating the deformed threads which provide the locking means.

FIG. 4 is a side elevation of the male bolt core member.

FIG. 5 is a partial cross sectional elevation of the female nut member.

FIG. 6 is a partial cross sectional elevation illustrating a countersunk head configuration.

FIG. 7 is a cross sectional elevation of an alternate form using unfinished threads.

FIG. 8 is a partial cross sectional elevation illustrating the unfinished threads of FIG. 7.

FIG. 9 is a cross sectional elevation of the female nut member illustrating an alternate means for obtaining a lock between the workpieces.

FIG. 10 is a side elevation of the locked blind fastener of FIGS. 7 and 8.

FIGS. 11 and 12 are diagramatic cross sectional illustrations of the bulbing action of the blind fastener of FIG. 7.

FIG. 13 is a diagramatic cross sectional illustration of the bulbing action of the blind fastener of FIG. 9.

FIG. 14 is a side elevation of an alternate form of a bolt of the present invention.

Referring now to FIGS. 1 and 2, the blind fastener consists in all of its various modifications of an inner male core member 1 and an outer female nut member 2. The inner core member threadably engages the outer nut member on the blind side 4 of the work area. At the other end of inner core 1 is a holding recess 6 in the shaft and a break-off groove 8 which causes all of the shaft end 10 to break off after wrenching has been accomplished to assure a flush finish.

Referring now particularly to FIG. 2 at the blind end of the fastener a collapsing groove 12 is provided which is proximal to the blind side 4 of the work piece or sheets 14 and 15 which are to be joined. In wrenching this blind fastener the nut 16 is held and the core bolt 1 is drawn upwardly, as the larger head end 18 is drawn into engagement with the walls 20 of the female nut member 2. As wrenching progresses, a bulb 22 is formed at the area of the collapsing groove 12 against the blind side 4 of the workpiece until the two workpieces 14 and 15 are drawn together. As this wrenching progresses further, threads 24 in the lower portion of the female nut are being deformed and locked against threads 26 of the core member thus forming a thread lock which resists unlocking by vibration. This bulbing action may also be accomplished in smaller sized blind fasteners by annealing the entire threaded section. In this instance, the bulb will form at the point of greatest resistance which would be at the blind surface 4 of the workpiece thus assuring a tight joint of high integrity.

In all illustrations of the present invention where alloy steel bolts are used the blind end of the female nut member are annealed to allow this bulbing action at installation.

Referring briefly now to FIGS. 9 and 10, the action of the blind fastener is the same as has just been described except that instead of the collapsing groove 12 of FIGS. 1 and 2 the inner surface of the female nut member has an undercut collapsing groove 30 above the threaded engagement area 32. The threads cause this weakened area to be drawn together to form bulb 34 in the blind area 4 while at the same time deforming the unfinished threads 36 to form a thread lock.

A further variation of the present invention is illustrated by FIGS. 7, 8 and 12 which employ incomplete threads 40 and 42 which start the bulbing action as these threads attempt to complete themselves. As the bulbing action continues these threads also become deformed to form a thread lock.

FIG. 6 illustrates a form of the present invention employing a countersunk head or which is commonly referred to in the art as a flush rivet and FIG. 14 illustrates the employment of a tapered blind fastener embodying the present invention.

Various changes and modifications may be made in carrying out the present invention without departing from the scope and spirit thereof. Insofar as these changes and modifications are within the purview of the amended claims, they are to be considered as part of the invention.

I claim:

1. A blind fastener assembly for securing a plurality of workpieces together comprising:

a central male core member threadably engageable by an outer female nut member completely surrounding said central male core member;

said blind fastener having a head portion at one end of said female nut member and a blind portion at the other end which is inserted into the workpiece into the unaccessable blind area of said workpiece;

means on the head end of said female nut member of said blind fastener for holding the female nut member;

means forming a head portion on said male core member, said means being engageable by a tool whereby said male core member can be rotatably driven into threaded engagement with said female nut member;

means on the blind end of said male core member and said female nut member for resisting said driving, said means being comprised of a portion of the blind end of said male core member having an external diameter greater than the internal diameter of said female nut member, said portion having a first plurality of threads therein and a portion of the blind end of said female nut member having a second plurality of threads therein, said second plurality being adaptable to being threadably engaged with said second plurality, whereby upon threaded engagement said first and second pluralities of threads extend from the blind end of said fastener to a point below the interface of said workpieces;

the combination of driving and resisting forming a bulbous member on the blind end of said fastener thereby securing said plurality of workpieces.

2. The combination of claim 1 including a collapsing groove in said female nut member thereby decreasing resistance to formation of the bulbous member at said groove.

3. A blind fastener assembly for securing a plurality of workpieces together comprising:

a central male core member threadably engageable by an outer female nut member completely surrounding said central male core member;

said blind fastener having a head portion at one end of said female nut member and a blind portion at the other end which is inserted into the workpiece into the unaccessable blind area of said workpiece;

means on the head end of said female nut member of said blind fastener for holding the female nut member;

means forming a head portion on said male core member, said means being engageable by a tool whereby said male core member can be rotatably driven into threaded engagement with said female nut member;

means on the blind end of said male core member and said female nut member for resisting said driving, said means comprising a portion of the blind end of said male core member having a first plurality of unfinished threads therein and a portion of the blind end of said female nut member having a second plurality of unfinished threads therein, said second plurality being adaptable to being threadably engaged with said first plurality whereby upon threaded engagement said first and second pluralities of unfinished threads extend from the blind end of said fastener to a point below the interface of said workpiece;

the combination of driving and resisting forming a bulbous member on the blind end of said fastener thereby securing said plurality of workpieces.

4. The combination of claim 3 including a collapsing groove in said female nut member thereby decreasing resistance to formation of the bulbous member at said groove.

* * * * *